(12) United States Patent
Zhou et al.

(10) Patent No.: US 12,520,406 B2
(45) Date of Patent: Jan. 6, 2026

(54) LIGHTING-EFFECT CONTROL METHOD, APPARATUS, LIGHTING DEVICE, ELECTRONIC DEVICE, AND STORAGE MEDIUM

(71) Applicant: Shenzhen Intellirocks Tech. Co., Ltd., Shenzhen (CN)

(72) Inventors: Jie Zhou, Shenzhen (CN); Wenlong Wu, Shenzhen (CN)

(73) Assignee: Shenzhen Intellirocks Tech. Co., Ltd., Shenzhen (CN)

(*) Notice: Subject to any disclaimer, the term of this patent is extended or adjusted under 35 U.S.C. 154(b) by 122 days.

(21) Appl. No.: 18/559,324

(22) PCT Filed: Jan. 19, 2022

(86) PCT No.: PCT/CN2022/072803
§ 371 (c)(1),
(2) Date: Nov. 6, 2023

(87) PCT Pub. No.: WO2023/123581
PCT Pub. Date: Jul. 6, 2023

(65) Prior Publication Data
US 2024/0244729 A1    Jul. 18, 2024

(30) Foreign Application Priority Data
Dec. 29, 2021  (CN) .......................... 202111640100.7

(51) Int. Cl.
H05B 47/115    (2020.01)
H05B 47/155    (2020.01)

(52) U.S. Cl.
CPC .................. *H05B 47/115* (2020.01)

(58) Field of Classification Search
CPC ..................................... H05B 47/115
See application file for complete search history.

(56) References Cited

U.S. PATENT DOCUMENTS

2018/0020524 A1*    1/2018    Tylicki ................... F21S 10/04

FOREIGN PATENT DOCUMENTS

| CN | 106950847 A | | 1/2014 | |
| CN | 104766419 A | * | 7/2015 | ............. G08B 21/02 |

* cited by examiner

Primary Examiner — Henry Luong
(74) Attorney, Agent, or Firm — Wenye Tan

(57) ABSTRACT

This disclosure discloses a lighting-effect control method, apparatus, lighting device, electronic device, and storage medium. The lighting-effect control method is applied to a controller. The controller is connected to a plurality of lighting units and a detection sensor respectively. The method includes: determining a state of the lighting device; when the state of the lighting device is a motion state, determining a target color area according to detection data of the detection sensor; determining a target color value corresponding to each lighting unit according to the target color area; and controlling each lighting unit to display a corresponding target color value, thereby dynamically adjusting the target color value displayed by each lighting unit according to changes in the state of the lighting device and the detection data, and enriching lighting-effect control methods.

12 Claims, 7 Drawing Sheets

LIGHTING-EFFECT CONTROL METHOD, APPARATUS, LIGHTING DEVICE, ELECTRONIC DEVICE, AND STORAGE MEDIUM

CROSS-REFERENCE TO RELATED APPLICATIONS

This application is a national stage entry of PCT Patent Application No. PCT/CN2022/072803, filed on Jan. 19, 2022, which claims the priority of Chinese Patent Application No. 2021116401007, filed on Dec. 29, 2021, the entire content of all of which is incorporated herein by reference.

FIELD OF THE DISCLOSURE

The present disclosure relates to the field of lighting control technology and, more specifically, to a lighting-effect control method, apparatus, lighting device, electronic device, and storage medium.

BACKGROUND

Most of the current lighting products are set with fixed lighting effect levels, and each lighting effect level has a corresponding controlled lighting effect. When the user selects a specific level, the lighting product will display the controlled lighting effect corresponding to the specific level. However, as a specific level corresponds to a fixed controlled light effect, this lighting-effect control method has few change in lighting effect, and cannot meet the growing needs of users.

SUMMARY OF THE DISCLOSURE

In view of the above problems, the present disclosure proposes a lighting-effect control method, apparatus, lighting device, electronic device, and storage medium to improve the above problems.

In a first aspect, embodiments of the present disclosure provide a lighting-effect control method. The method is applied to a controller. The controller is connected to a plurality of lighting units and a detection sensor respectively. The method includes: determining a state of the lighting device; when the state of the lighting device is a motion state, determining a target color area according to detection data of the detection sensor; determining a target color value corresponding to each lighting unit according to the target color area; and controlling each lighting unit to display a corresponding target color value.

In a second aspect, embodiments of the present disclosure also provide a lighting device. The lighting device includes a controller, a plurality of lighting units, and a detection sensor. The controller is connected to the plurality of lighting units and the detection sensor respectively; and the controller is used to perform the lighting-effect control method described in the first aspect.

In a third aspect, embodiments of the present disclosure also provide a lighting-effect control apparatus. The apparatus is applied to a controller, and the controller is connected to a plurality of lighting units and a detection sensor respectively. The apparatus includes: a state determination module, a target color area determination module, a target color value determination module, and a control module. The state determination module is used to determine a state of the lighting device, the target color area determination module is used to, when the state of the lighting device is a motion state, determine a target color area according to detection data of the detection sensor; the target color value determination module is used to determine a target color value corresponding to each lighting unit according to the target color area; and the control module is used to control each lighting unit to display a corresponding target color value.

In a fourth aspect, embodiments of the present disclosure further provide an electronic device. The electronic device includes: one or more processors, memories, and one or more application programs. The one or more application programs are stored in the memory and configured to be executed by the one or more processors, and the one or more application programs are configured to execute the lighting-effect control method as described in the above first aspect.

In a fifth aspect, embodiments of the present disclosure further provide a computer-readable storage medium, the computer-readable storage medium stores program codes, and the program codes can be called by a processor to execute the lighting-effect control method as described in the first aspect.

This disclosure discloses a lighting-effect control method, apparatus, lighting device, electronic device, and storage medium. The lighting-effect control method is applied to a controller. The controller is connected to a plurality of lighting units and a detection sensor respectively. The method includes: determining a state of the lighting device; when the state of the lighting device is a motion state, determining a target color area according to detection data of the detection sensor; determining a target color value corresponding to each lighting unit according to the target color area; and controlling each lighting unit to display a corresponding target color value, thereby dynamically adjusting the target color value displayed by each lighting unit according to changes in the state of the lighting device and the detection data, and enriching lighting-effect control methods.

BRIEF DESCRIPTION OF THE DRAWINGS

In order to more clearly illustrate the technical solutions in the embodiments of the present disclosure, the drawings used in the description of the embodiments will be briefly introduced below. Obviously, the drawings in the following description are only some embodiments of the present disclosure, but not all the embodiments. Based on the embodiments of the present disclosure, other embodiments and drawings obtained by those of ordinary skill in the art without creative efforts fall within the scope of protection of the present disclosure.

DETAILED DESCRIPTION

In order to enable those skilled in the art to better understand the solutions of the present disclosure, the technical solutions in the embodiments of the present disclosure will be described below together with the drawings.

Most of the current lighting products are set with fixed lighting effect levels, and each lighting effect level has a corresponding controlled lighting effect. When the user selects a specific level, the lighting product will display the controlled lighting effect corresponding to the specific level. For example, the lighting product can be set with a first lighting-effect level, a second lighting-effect level, and a third lighting-effect level with different lighting effects. When the user selects the first lighting-effect level, the lighting product displays the first lighting effect corresponding to the first lighting-effect level; when the user selects the second lighting-effect level, the lighting product displays the second lighting effect corresponding to the second lighting-effect level. If the user does not adjust the selected lighting-effect level, the corresponding displayed lighting effect of the lighting product usually remains unchanged.

However, as the specific level corresponds to a fixed controlled lighting effect. This lighting-effect control method has few change in lighting effect and cannot meet the growing needs of users.

In order to improve the above technical problems, the inventor of this disclosure proposes a lighting-effect control method, apparatus, lighting device, electronic device, and storage medium provided in this disclosure. The lighting-effect control method is applied to a controller, and the controller is connected to a plurality of lighting units and a detection sensor respectively. The method includes: determining the state of the lighting device; if the state of the lighting device is in a motion state, determining a target color area according to the detection data of the detection sensor; determining a target color value corresponding to each lighting unit according to the target color area; and controlling each lighting unit to display the corresponding target color value, thereby dynamically adjusting the target color value displayed by each lighting unit according to the state of the lighting device and the changes of the detection data, enriching the lighting effect control.

The following will introduce a lighting-effect control lighting device provided by embodiments of the present disclosure.

Figure 1:
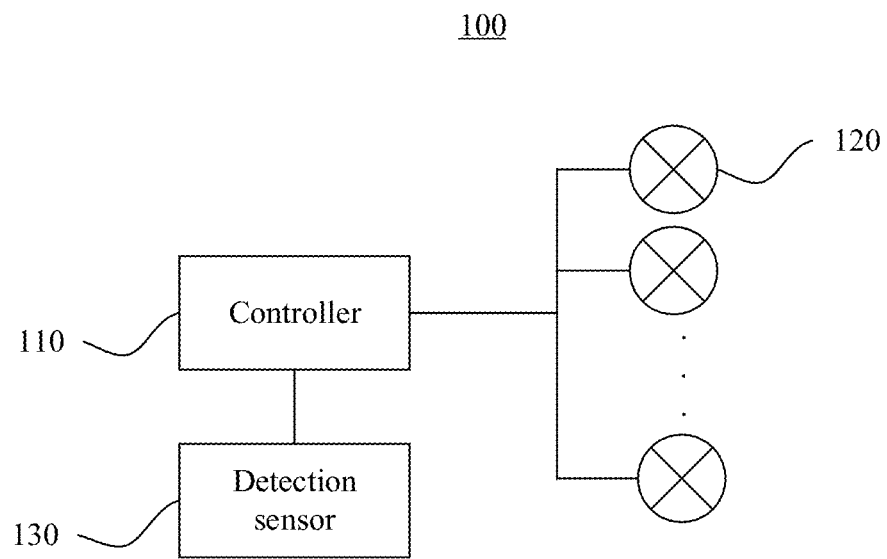
FIG. 1 shows a schematic structural diagram of a lighting device according to an embodiment of the present disclosure.

Referring to FIG. 1, FIG. 1 shows a lighting device 100 provided by an embodiment of the present disclosure. The lighting device includes: a controller 110, a plurality of lighting units 120, and a detection sensor 130. The controller 110 is connected to the plurality of lighting units 120 and the detection sensor 130 respectively.

In the embodiments of the present disclosure, the detection sensor 130 is used to collect detection data. The detection sensor 130 may include, but is not limited to: an acceleration sensor, a speed sensor, a pressure sensor, etc. The detection sensor 130 has a corresponding measurement range and can be used to detect detection data within the measurement range. In actual use, the required measurement range can be selected as needed. For example, the acceleration sensor can select a measurement range of ±2 g, ±4 g, ±8 g, ±16 g, etc., where g is the acceleration of gravity.

In some embodiments, the detection data includes first detection data in a first direction, second detection data in a second direction, and third detection data in a third direction, where the first direction, the second direction, and the third direction are perpendicular to one another.

In the embodiments of the present disclosure, the controller 110 can obtain the detection data collected by the detection sensor 130, determine a target color area according to the detection data, and then control the lighting effect of the corresponding lighting units 120, details of which will be described in the following embodiments.

In some embodiments, the lighting device 100 may include multiple light units 120, and the light units 120 may display different color values under the control of the controller 110.

In some embodiments, the lighting device 100 may also include one or more detection sensors 130.

Optionally, when the lighting device 100 includes a detection sensor 130, the controller 110 can control all the lighting units 120 to display corresponding color values based on the detection data collected by the detection sensor 130.

Optionally, when the lighting device 100 includes multiple detection sensors 130, the types of the multiple detection sensors 130 may be different, and the controller 110 may control the corresponding light units 120 to display the corresponding color values based on the detection data collected by each detection sensor 130. For example, the lighting device 100 includes a first detection sensor and a second detection sensor, and the lighting device 100 includes a first lighting unit, a second lighting unit, a third lighting unit, and a fourth lighting unit. The first detection sensor corresponds to the first lighting unit and the second lighting unit, and the second detection sensor corresponds to the third lighting unit and the fourth lighting unit. The first detection sensor may be an acceleration sensor, and the second detection sensor may be a speed sensor. The controller 110 may control the first lighting unit and/or the second lighting unit to display corresponding color values according to the first detection data collected by the first detection sensor. The controller may control the third lighting unit and/or the fourth lighting unit according to the second detection data collected by the second detection sensor.

In some embodiments, multiple lighting units 120 may also be integrated to form one or more light strips.

In some embodiments, the controller 110 can establish connections with the plurality of lighting units 120 and the detection sensor 130 in a wired or wireless manner.

Figure 2:
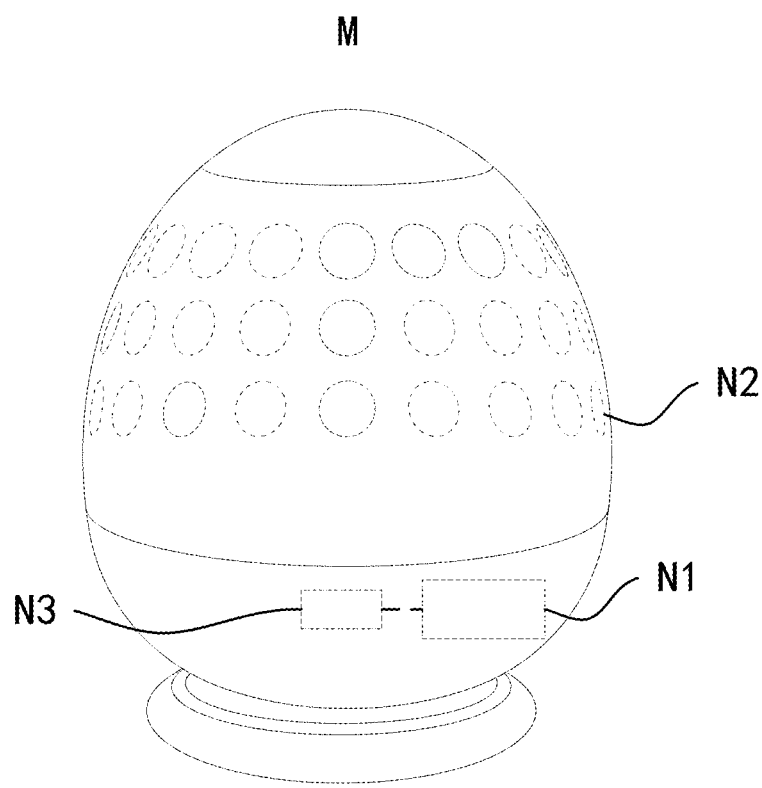
FIG. 2 shows a schematic structural diagram of another lighting device according to an embodiment of the present disclosure.

Referring to FIG. 2, FIG. 2 shows a lighting device M provided by another embodiment of the present disclosure. The lighting device M includes: a controller N1, a plurality of lighting units N2, and a detection sensor N3. Among them, the controller N1 is connected to the plurality of lighting units N2 and the detection sensor N3 respectively.

Figure 3:
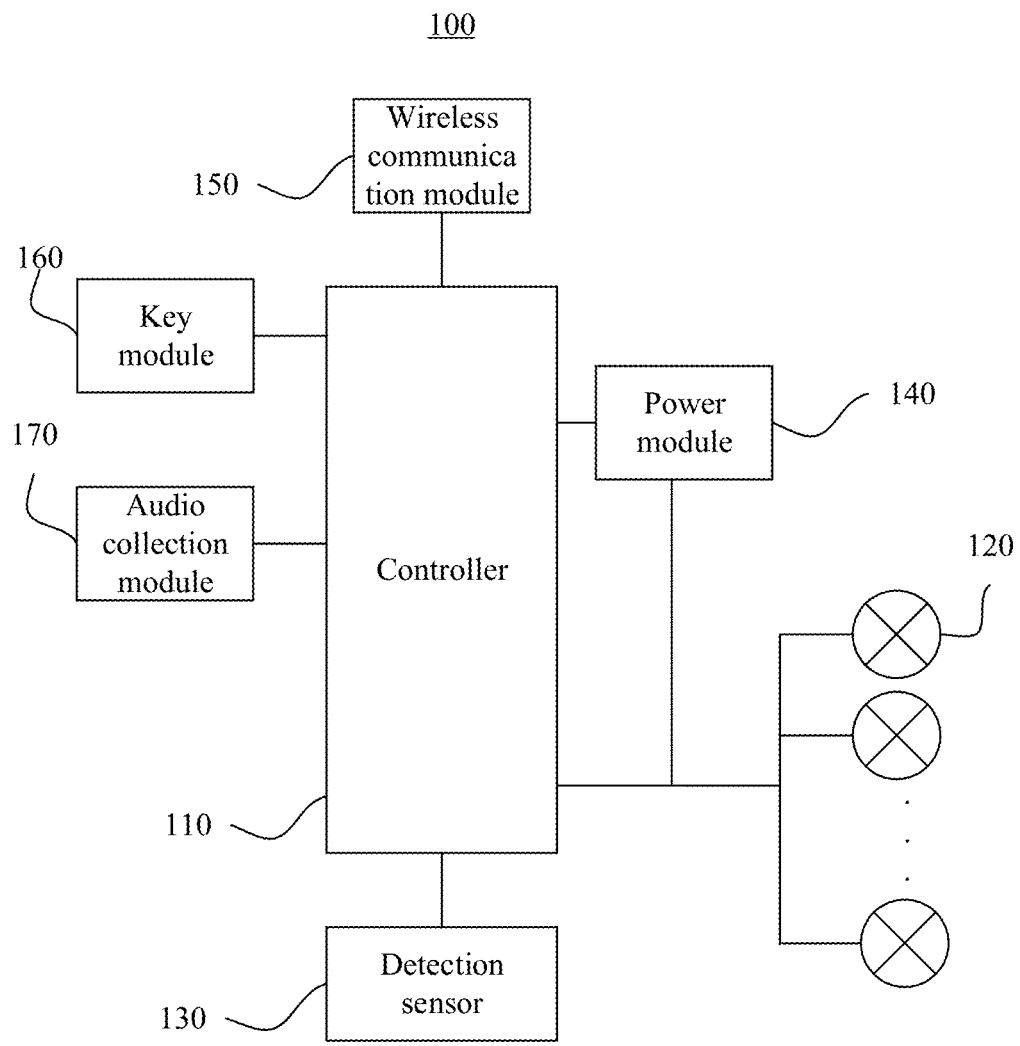
FIG. 3 shows a schematic structural diagram of another lighting device according to an embodiment of the present disclosure.

In some embodiments, as shown in FIG. 3, the lighting device 100 may also include a power module 140. The power module 140 is connected to the plurality of lighting units 120, the controller 110, and other modules that require power supply, thereby providing power supply for the lighting units 120, the controller 110 and other modules.

In some implementations, the lighting device 100 may also include a wireless communication module 150. The wireless communication module 150 may include, but is not limited to, a Bluetooth module, a WIFI module, an antenna module, etc. The wireless communication module 150 of the lighting device 100 can establish a communication connection with a terminal device through a network. The network is usually the Internet, but it can also be any other network, including but not limited to Local Area Network (LAN), Metropolitan Area Network (MAN), Wide Area Network (WAN), mobile, wired or any combination of wireless, private, or virtual private networks. In some embodiments, the wireless communication module 150 and the terminal device can communicate and transmit through specific communication protocols, including but not limited to BLE (Bluetooth low energy) protocol, WLAN (Wireless Local Area Network) protocol, Bluetooth protocol, ZigBee protocol or Wi-Fi (Wireless Fidelity) protocol, etc.

Optionally, the user can send a control instruction to the wireless communication module 150 through the terminal device, so that the controller 110 enters different lighting-effect control modes according to the control instruction. The terminal device includes, but are not limited to, a mobile phone, tablet, wearable device, etc., which are not limited in this disclosure.

In some implementations, as shown in FIG. 3, the lighting device 100 may further include a key module 160. The key module 160 is connected to the controller 110, and the user can input different control instructions to the controller 110 by selecting different keys.

In some implementations, as shown in FIG. 3, the lighting device 100 may further include an audio collection module 170. The audio collection module 170 may be, for example, a microphone, a microphone array, or the like. The audio collection module 170 can collect analog signals of audio in the environment. For example, it can collect the user's voice instructions.

The controller of the lighting device 100 in the embodiments of the present disclosure can be used to execute the lighting-effect control method, which will be described below with reference to certain embodiments.

Figure 4:
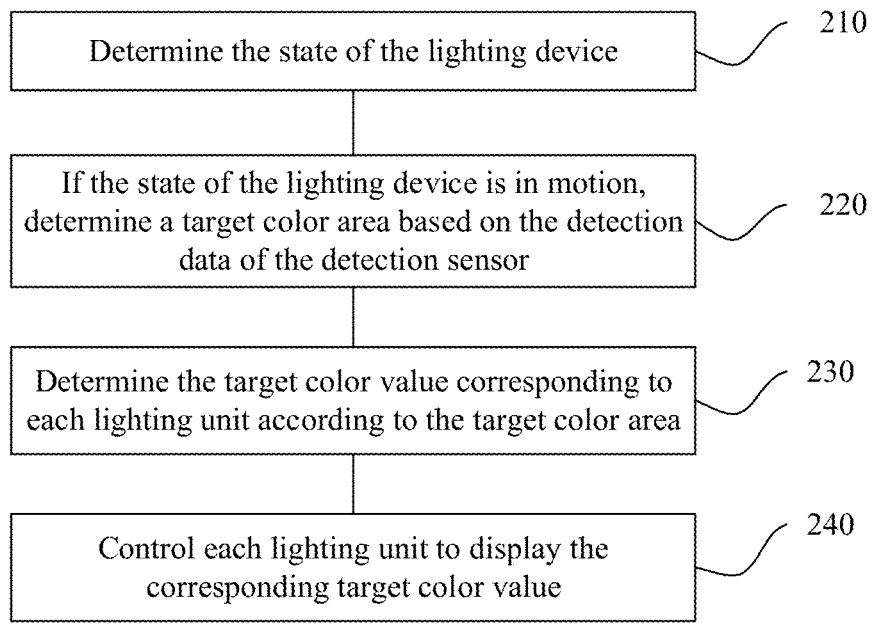
FIG. 4 shows a schematic flowchart of a lighting-effect control method proposed by an embodiment of the present disclosure.

Referring to FIG. 4, an embodiment of the present disclosure provides a lighting-effect control method. The lighting-effect control method can be applied to a controller. The lighting-effect control method of the embodiments of the present disclosure can include: Steps 210 to 240.

Step 210: Determine the state of the lighting device.

In the embodiments of the present disclosure, the controller may determine the state of the lighting device (e.g., a lamp) according to the detection data of the detection sensor. Optionally, depending on whether the lighting device is moving, the state of the lighting device may include: a motion state and a stationary state. Optionally, according to the movement of the lighting device, the state of the lighting device may also include: an acceleration state, a deceleration state, a constant speed state, etc. Specifically, the state of the lighting device can be determined based on the detection data of the detection sensor. The following uses a specific implementation to describe how to determine the state of the lighting device.

Specifically, using the state of the lighting device including the motion state and the stationary state as an example, the state of the lighting device can be determined according to the following steps.

(1) Obtain the Detection Data of the Detection Sensor.

In the embodiments of the present disclosure, the controller may obtain the detection data of the detection sensor. Optionally, the controller can regularly collect detection data from the detection sensor according to a preset detection time interval. The specific value of the detection time interval can be set according to actual needs, and this disclosure does not limit this.

In some embodiments, the detection sensor is an acceleration sensor. The detection data of the detection sensor may include components in multiple directions. For example, the detection data may include first detection data in the first direction, second detection data in the second direction, and third detection data in the third direction.

(2) If the Detection Data is Greater than a Preset Detection Threshold, the State of the Lighting Device is in the Motion State.

In the embodiments of the present disclosure, when the user moves the lighting device, that is, when the state of the lighting device is in the motion state, the detection data is greater than the preset detection threshold.

Optionally, the value of the preset detection threshold can be zero, and when the lighting device is stationary, the detection data collected by the detection sensor is zero. When the user moves the lighting device, the lighting device moves, and the detection data collected by the detection sensor is greater than zero.

Optionally, in order to prevent changes in the state of the lighting device caused by slight shaking, such as slight shaking of the lighting device caused by a slight collision, in which case the user does not actually control the movement of the lighting device. In order to filter out misjudgments on the state of the lighting device caused by non-user control, in some implementations, the value of the preset detection threshold can also be greater than zero. The specific value of the preset detection threshold can be set according to actual use needs. This disclosure does not limit this.

(3) Otherwise, the State of the Lighting Device is the Stationary State.

In the embodiments of the present disclosure, if the detection data is less than or equal to the preset detection threshold, the state of the lighting device is a stationary state.

Further, different lighting-effect control methods can be corresponding to different states, which will be explained in detail below.

Step 220: If the state of the lighting device is in motion, determine a target color area based on the detection data of the detection sensor.

In the embodiments of the present disclosure, the controller can determine the target color area based on the detection data of the detection sensor. If the target color area is different, the corresponding color value used to control the lighting unit may also change accordingly, thereby enriching the way the lighting effect changes.

Figure 5:
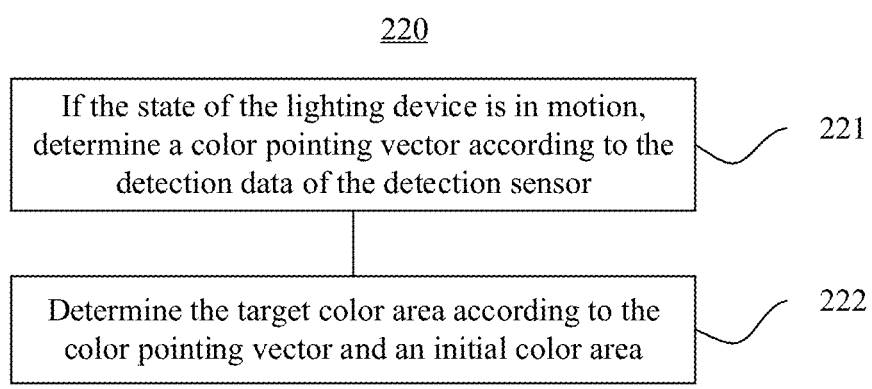
FIG. 5 shows a schematic flowchart of determining the target color area in S220 in the lighting-effect control method proposed by an embodiment of the present disclosure.

In some implementations, as shown in FIG. 5, Step 220 may include: Steps 221 to 222.

Step 221: If the state of the lighting device is in motion, determine a color pointing vector according to the detection data of the detection sensor.

In embodiments of the present disclosure, the components of the detection data in different directions can be corresponding to the components of a color space in different dimensions, thereby determining the color pointing vector.

In some implementations, the detection data may include first detection data in a first direction, second detection data in a second direction, and third detection data in a third direction, where the first direction, the second direction, and the third direction are perpendicular to each other.

In the embodiments of the present disclosure, each point on the preset color space can represent a corresponding color value. The default color space can include, but is not limited to an LAB (Lab Color Space, color opposition space) color space; an RGB (Red, Green, Blue) color space, an HSV (Hue, Saturation, Value) color space; a YUV (Y-brightness; U and V-chroma) color space, etc.

In some implementations, the preset color space may include multiple components in different dimensions. For example, the LAB color space includes a L component, an A component, and a B component, the RGB color space includes an R component, a G component, and a B component, the HSV color space includes an H component, an S component, and a V component, and the YUV color space includes a Y component, a U component, and a V component, etc.

In the embodiments of the present disclosure, each component of the color space can be determined by detecting the component in one direction of the data, thereby determining each component of the color space, and then determining the color pointing vector. Taking the color space as the Lab color space as an example, the Lab color space includes the L component, a component, and b component. The first detection data of the detection data in the first direction can be used to determine the L component; the second detection data of the detection data in the second direction can be used to determine the a component, and the third detection data of the detection data in the third direction can be used to determine the b component. The specific settings can be based on actual use needs, and this disclosure does not limit this. Thus, the color pointing vector is determined based on the detection data to adjust the target color area for control.

In some implementations, step 221 may include the following.

(1) Determine the Color Component Based on the Detection Data of the Detection Sensor.

In the embodiment of the present disclosure, using the detection sensor as an acceleration sensor as an example, the detection data of the detection sensor may include first detection data in the first direction, second detection data in the second direction, and third detection data in the third direction.

In embodiments of the present disclosure, the color component may include multiple color components of different dimensions. For example, the color component may include a first color component, a second color component, and a third color component, where the first color component is the color component of the first dimension of the preset space, the second color component is a color component in the second dimension of the preset space, and the third color component is the color component of the third dimension of the preset space.

In some embodiments, the color component may be determined based on the detection data of the detection sensor. For example, the first color component may be determined based on the first detection data; the second color component may be determined based on the second detection data; and the third color component may be determined based on the third detection data.

If the selected acceleration sensor's detection ranges in different directions are: the detection range in the first direction is ±10 g, the detection range in the second direction is ±10 g, and the detection range in the third direction is ±10 g. The selected color space uses the LAB color space as an example. The range of LAB color space in the brightness component L component is 0~100, the first chromaticity component (a) on the green-red axis is +127~−128, and the second chromaticity component (b) on the blue-yellow axis is +127~128. Then, the detection ranges in the corresponding directions can be converted into color components in the color space. For example, the detection range of ±10 g in the first direction can correspond to the range of 0~100 on the L component; the detection range of ±10 g in the second direction can correspond to the first chromaticity component on the green-red axis of +127~−128; and the detection range of ±10 g in the third direction can correspond to the second chromaticity component on the blue-yellow axis of +127~128.

Specifically, the corresponding L component can be obtained according to Formula 1, that is:

$$\frac{L\ \text{component}}{L\ \text{component range}} = \frac{\text{Detection data in the first direction}}{\text{Detection range in the first direction}} \quad \text{(Formula 1)}$$

The corresponding a component can be obtained according to formula 2, that is:

$$\frac{a\ \text{component}}{a\ \text{component range}} = \frac{\text{Detection data in the second direction}}{\text{Detection range in the second direction}} \quad \text{(Formula 2)}$$

The corresponding b component can be obtained according to formula 3, that is:

$$\frac{b\ \text{component}}{b\ \text{component range}} = \frac{\text{Detection data in the third direction}}{\text{Detection range in the third direction}} \quad \text{(Formula 3)}$$

Therefore, if the detection data of the lighting device in the first direction is 5 g, then according to Formula 1, the L component is 75; if the detection data in the second direction is 5 g, then according to Formula 2, the a component is 64; if the detection data in the third direction is 5 g, then according to Formula 3, the b component is 64.

It can be understood that when other color spaces are selected, the color components of other color spaces can be obtained similarly by referring to the above example.

(2) Determine the Color Pointing Vector According to the Color Components.

In embodiments of the present disclosure, the controller may further determine a target color area for color control according to the color components. Specifically, the color pointing vector can be determined according to the color components, so that the target color area can be determined according to the color pointing vector.

Alternatively, the color pointing vector may be a composite vector of color components. Using the color space as the Lab color space as an example, it includes the L component, a component, and b component. The L component, a component, and b component can be synthesized to obtain a composite vector as the color pointing vector.

In the embodiments of the present disclosure, when the color component includes a first color component, a second color component, and a third color component, the first color component, the second color component, and the third color component can be synthesized to obtain a color pointing vector.

Step 222: Determine the target color area according to the color pointing vector and an initial color area.

In the embodiments of the present disclosure, when the lighting device is in motion, the initial color area is the color area used for color control of the lighting units before the detection data of the detection sensor changes.

Figure 6:
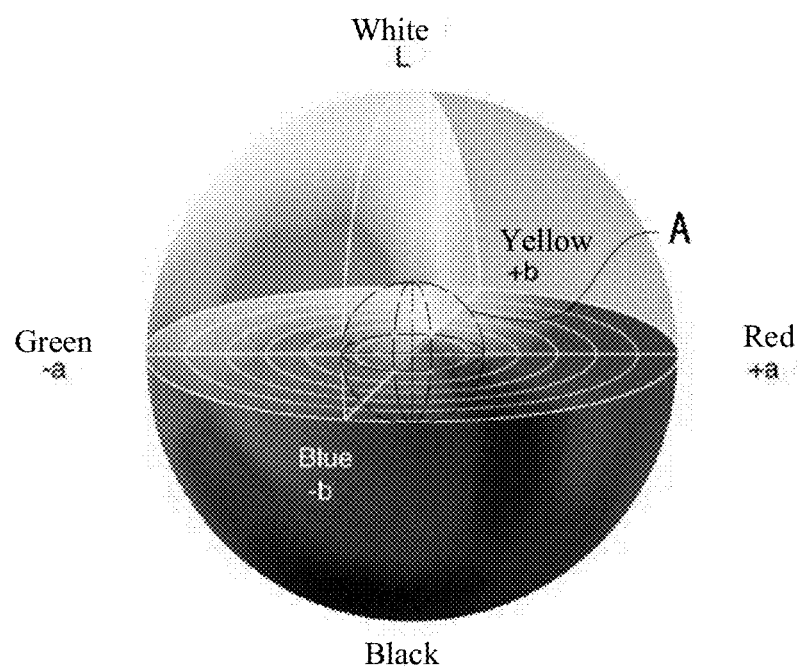
FIG. 6 shows a schematic diagram of the Lab color space in the embodiments of the present disclosure.

In some implementations, if the state of the lighting device changes from a stationary state to a motion state, the initial color area may be a first color area preset in the color space. The initial color area includes multiple color sub-areas, and each lighting unit corresponds to one of the color sub-areas. Using the color space as the Lab color space as an example, FIG. 6 shows a schematic diagram of the color model of the Lab color space. The first color area can be the surface of a spherical area of a sphere with the center of the Lab color space color model as a starting/center point, and with a preset threshold as the radius, where the color values corresponding to the surface are used to control the color displayed by the plurality of lighting units. It can be understood that the value of the preset threshold can be set according to actual needs. For example, the value of the preset threshold can range from 5 to 10. Different preset thresholds have different corresponding color values, and this disclosure does not limit this.

In some embodiments, if the state of the lighting device is in a motion state and the detection data of the detection sensor changes, the initial color area may be the target color area before the detection data changes.

For example, if the lighting device changes from a stationary state to a first motion state and the detection sensor detects the first detection data, the color area corresponding to the lighting device in the stationary state is the first color area. In the first motion state, the corresponding initial color area is the first color area, and a second color area is determined according to the first color area and the first detection data, as the target color area of the lighting device in the first motion state.

For example, if the lighting device continues to transition from the first motion state to a second motion state and the detection sensor detects the second detection data, then the initial color area corresponding to the lighting device in the second motion state is the second color area, that is, the target color area in the first motion state. A third color area is determined based on the second color area and the second detection data, as the target color area of the lighting device in the second motion state.

In order to ensure complete control of the color of the lighting units, in some embodiments, the number of color sub-areas in the initial color area is not less than the number of lighting units.

Optionally, the shape of the initial color area corresponds to the shape of the plurality of lighting units. For example, if multiple lighting units are distributed to form a sphere, the shape of the initial color area may be a corresponding spherical shape. If the plurality of lighting units are distributed to form a cylinder, and the shape of the initial color area can also be a corresponding cylinder, etc.

Furthermore, in the color space, the target color area can be determined based on the initial color area and the color pointing vector. That is, the color area used to control the color of the lighting units in the color space is adjusted according to change in the detection data.

Figure 7:
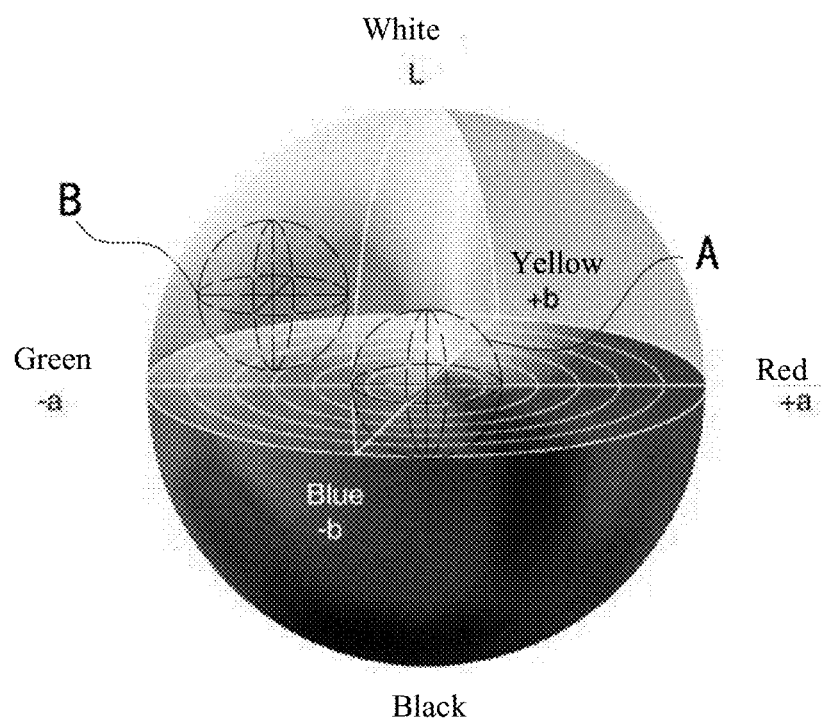
FIG. 7 shows a schematic diagram of determining the target color area in the Lab color space in the embodiments of the present disclosure.
Figure 8:
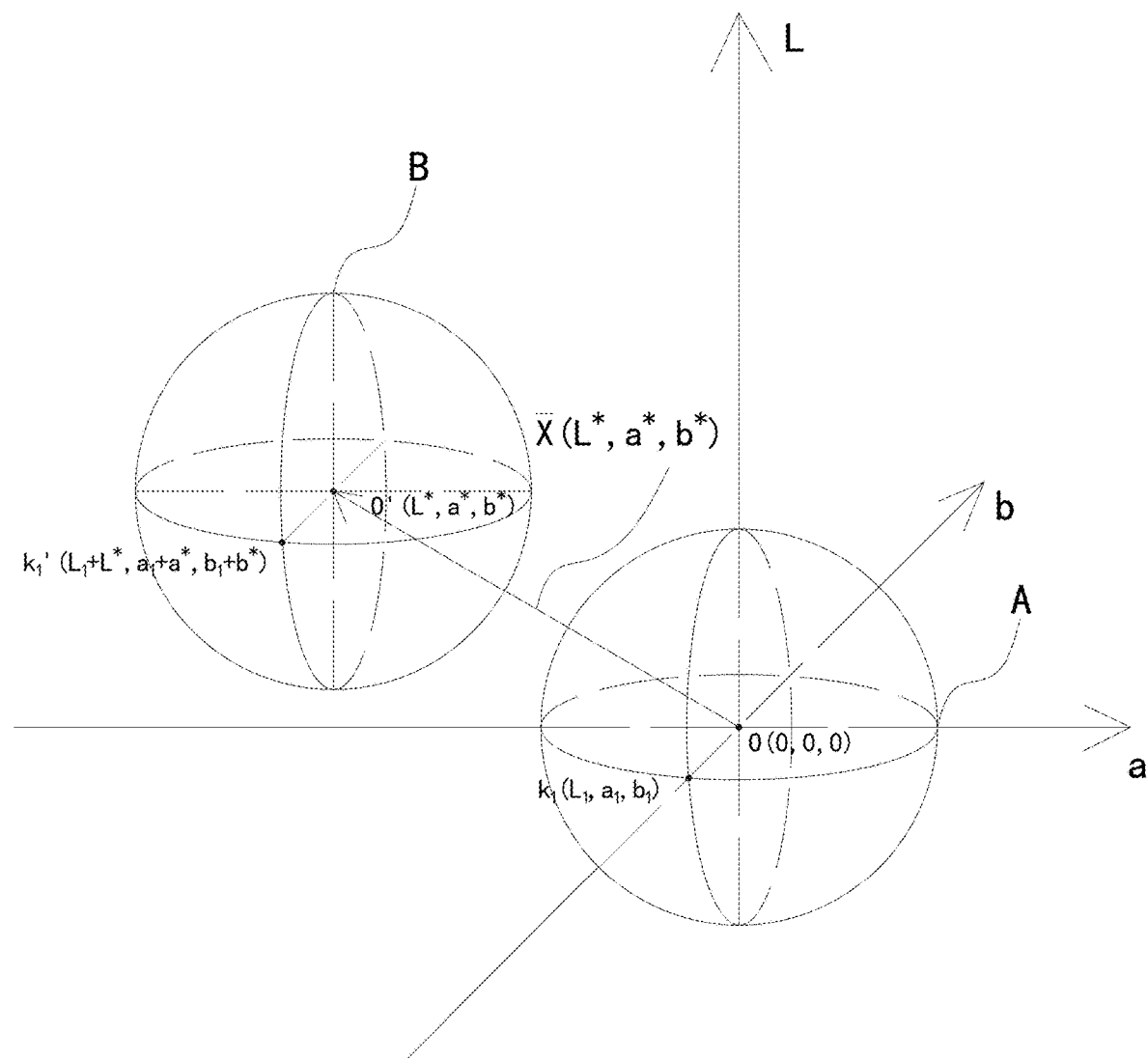
FIG. 8 is a schematic diagram of the target color area corresponding to FIG. 7.

Referring to FIGS. 7 and 8, for example, if the color pointing vector is determined to be $\overline{X}$ (L*, a*, b*) according to the detection data, then each point in the initial color area A is moved toward the L axis by the L1 component, moved toward the a-axis by the a1 component, moved toward the b-axis by the b1 component, and the resulting area is used as the target color area B. As shown in FIG. 8, point O (0, 0, 0) in the initial color area A moves according to the color pointing vector and transforms into point O' (L*, a*, b*) in the target color area B. The point k1 ($L_{k1}$, $a_{k1}$, $b_{k1}$) in the initial color area A is moved according to the color pointing vector $\overline{X}$ and transformed into point O' (Lk1+L*, ak1+a*, bk1+b*) in the target color area B. Similarly, other points on the initial color area A are moved according to the color pointing vector $\overline{X}$ (L*, a*, b*), and finally the target color area B is obtained.

Step 230: Determine the target color value corresponding to each lighting unit according to the target color area.

In some embodiments, the target color area includes a plurality of color sub-areas, and each lighting unit corresponds to one of the color sub-areas. Specifically, the controller can determine the target color value corresponding to each lighting unit according to the color sub-area corresponding to each lighting unit, thereby displaying different color values according to the different detection data, further enriching the way the lighting effect changes, and improving user experience.

In order to ensure complete control of the color of the lighting units, in some embodiments, the number of color sub-areas in the target color area is not less than the number of lighting units.

In the embodiments of the present disclosure, if there are multiple color values corresponding to one color sub-area, the target color value can be determined from the multiple color values corresponding to the color sub-area.

Optionally, the controller may use the color value corresponding to the midpoint of the color sub-area as the target color value corresponding to the lighting unit.

Optionally, the controller can also use the average value of all color values in the color sub-area as the target color value corresponding to the lighting unit.

In some implementations, the target color value can be presented by selecting a specific target color space. For example, the target color space can be presented by an RGB color space, which can include a red component, a green component, and a blue component. Furthermore, if the detection data is converted into components of other non-target color spaces, in order to obtain the target color value, it is necessary to further convert the obtained components of other non-target color spaces into components corresponding to the target color space, thereby obtaining the target color values. For example, after obtaining the Lab color components of the corresponding point in the Lab color space according to the detection data, the Lab color components corresponding to the Lab color space can be further converted into the RGB color components corresponding to the RGB color space, thereby obtaining the target color value.

Step 240: Control each lighting unit to display the corresponding target color value.

In the embodiments of the present disclosure, the lighting units are controlled according to the target color value corresponding to each lighting unit determined by the aforementioned method, so that each lighting unit displays the corresponding target color value. The lighting units may, based on the change of the detection data, adjust the target color value accordingly and further display the lighting effect corresponding to the motion state of the lighting device, improving the user experience.

The specific process of the lighting-effect control method according to the present disclosure will be described below with a specific example.

In one embodiment, the user accelerates and moves the lighting device in a stationary state from the starting point Q1 to the point Q2, and then the user decelerates and moves the lighting device from the point Q2 to the end point Q3. Therefore, the state of the lighting device from points Q1 to Q3 includes the following.

State 1: The lighting device is at the starting point Q1 and the lighting device is in a stationary state.

At time t1, the lighting device is at the starting point Q1 and the lighting device is in a stationary state. In the stationary state, the lighting device controls the plurality of lighting units to display a stationary lighting effect. In one embodiment, the stationary lighting effect is that the lighting device controls each lighting unit to control the target color value of each lighting unit according to the initial color area.

If, in the stationary state, the initial color area is the first color area, then at time t1, the lighting device can determine the target color value of each lighting unit based on the first color area, thereby controlling each lighting unit to display the corresponding target color value.

State 2: The lighting device moves from the starting point Q1 to the point Q2. The lighting device is in a motion state and is also in an acceleration state.

At time t2~t3, the lighting device accelerates from the starting point Q1 to the point Q2, and the lighting device is in motion. In the motion state, the lighting device determines the target color area based on the detection data of the acceleration sensor, and then determines the target color value corresponding to each lighting unit based on the target color area.

At time t2, the first detection data of the acceleration sensor of the lighting device is 0.5 m/s$^2$. At this time, the initial color area is the first color area. According to the first color area and the first detection data 0.5 m/s$^2$, the second color area is determined as the target color area of the lighting device at time t2. Therefore, at time t2, the lighting device can determine the target color value of each lighting unit according to the second color area, thereby controlling each lighting unit to display the corresponding target color value.

At time t3, the second detection data of the acceleration sensor of the lighting device is 1 m/s$^2$. At this time, the initial color area is the second color area. According to the second color area and the second detection data 1 m/s$^2$, the third color area is determined as the target color area of the lighting device at time t3. Therefore, at time t3, the lighting device can control the target color value of each lighting unit according to the third color area, thereby controlling each lighting unit to display the corresponding target color value.

State 3: Moving from point Q2 to end point Q3: the lighting device is in a motion state and is also in a deceleration state.

At time t4~t5, the lighting device decelerates and moves from point Q2 to point Q3, and the lighting device is in a motion state. In the motion state, the lighting device determines the target color area based on the detection data of the acceleration sensor, and then determines the target color value corresponding to each lighting unit based on the target color area.

At time t4, the third detection data of the acceleration sensor of the lighting device is −2 m/s$^2$. At this time, the initial color area is the third color area. According to the third color area and the third detection data −2 m/s$^2$, the fourth color area is determined as the target color area of the lighting device at time t4. Therefore, at time t4, the lighting device can control the target color value of each lighting unit according to the fourth color area, thereby controlling each lighting unit to display the corresponding target color value.

At time t5, the fourth detection data of the lighting device's acceleration sensor is −1.5 m/s$^2$. At this time, the initial color area is the fourth color area. According to the fourth color area and the fourth detection data −1.5 m/s$^2$, a fifth color area is determined as the target color area of the lighting device at time t5. Therefore, at time t5, the lighting device can control the target color value of each lighting unit according to the fifth color area, thereby controlling each lighting unit to display the corresponding target color value.

State 4: The lighting device stops moving at the end point Q3. At this time, the lighting device is in a stationary state.

At time t6, the lighting device is at the end point Q3, and the lighting device is in a stationary state. In the stationary state, the lighting device controls the plurality of lighting units to display a stationary lighting effect. In one embodiment, the stationary lighting effect is that the lighting device controls each lighting unit to control the target color value of each lighting unit according to the initial color area. In one embodiment, in the stationary state, the initial color area is the first color area.

Therefore, at time t6, the lighting device can determine the target color value of each lighting unit according to the first color area, thereby controlling the target color value displayed by each lighting unit.

It can be understood that at t6 and t1, the lighting device is in the stationary state, so at t6 and t1, the lighting effect of the lighting device is the same, and the lighting effect of the lighting device is controlled according to the first color area.

In some implementations, the lighting-effect control method of the embodiments of the present disclosure may also include: if the state of the lighting device is the stationary state, controlling the plurality of lighting units to display a stationary lighting effect.

In the embodiments of the present disclosure, if the detection data is less than or equal to the preset detection threshold, the state of the lighting device is a stationary state. The stationary lighting effect corresponding to the stationary state can be preset, so that when the state of the lighting device is in the stationary state, the plurality of lighting units can be controlled to display the stationary lighting effect.

Optionally, the stationary lighting effect can be used to control the lighting device to perform color display based on the initial color area. Specifically, the initial color area may be a preset area of the color space. Using the color space as the Lab color space as an example, as shown in FIG. 6, FIG. 6 shows a schematic diagram of the color model of the Lab color space. The preset area can be the surface area of the sphere with the center of the Lab color space color model as the starting point and with the preset threshold as the radius. Thus, the colors displayed by the plurality of lighting units can be controlled based on the color values corresponding to the initial color area. It can be understood that the value of the preset threshold can be set according to actual needs. For example, the value of the preset threshold can range from 5 to 10. Different preset thresholds have different corresponding color values, and this disclosure does not limit this.

In some implementations, before Step 210, the lighting-effect control method of the embodiments of the present disclosure may further include: entering a lighting-effect control mode in response to a lighting-effect control mode selection operation. Step 210: Determining the state of the lighting device may include: Under the lighting-effect control mode, determining the state of the lighting device.

Optionally, the user can select the desired lighting-effect control mode through the key module, and the key module sends the corresponding mode selection instruction to the controller according to the user's selection.

Optionally, the user can also send a mode selection instruction to the wireless communication module through the terminal device. For example, the user can select the desired lighting-effect control mode through an application on the terminal device. The terminal device sends the mode selection instruction to the wireless communication module according to the user's selection, and the wireless communication module sends the received mode selection instruction to the controller.

Optionally, the user can also select the desired lighting-effect control mode through voice commands. The audio collection module collects the user's voice commands and sends the voice commands to the controller.

Optionally, the lighting device can also include a touch screen. The touch screen is connected to the controller. The user can select the lighting-effect control mode to be set on a mode selection interface displayed on the touch screen. After the touch screen receives the user's touch operation, an instruction corresponding to the lighting-effect control mode selected by the user can be sent to the controller.

It is understandable that different lighting-effect control modes can also be set according to actual use needs, as well as setting the lighting-effect control methods corresponding to the lighting-effect control modes. For example, in a normal mode, the plurality of lighting units can be controlled to display the same color value. In night mode, the plurality of lighting units can be controlled to display different color values or brightness values according to time, so that different lighting-effect control modes can be set to adapt to the various needs of users in different scenarios, improving the user experience.

Accordingly, embodiments of the present disclosure provide a lighting-effect control method by determining the state of the lighting device. If the state of the lighting device is in a motion state, the target color area is determined based on the detection data of the detection sensor, and the target color value corresponding to each lighting unit is determined based on the target color area. Each lighting unit is controlled to display the corresponding target color value, so that each lighting unit can be controlled to display a variety of target color values based on the state of the lighting device and the detection data, further enriching the lighting-effect control method.

Figure 9:
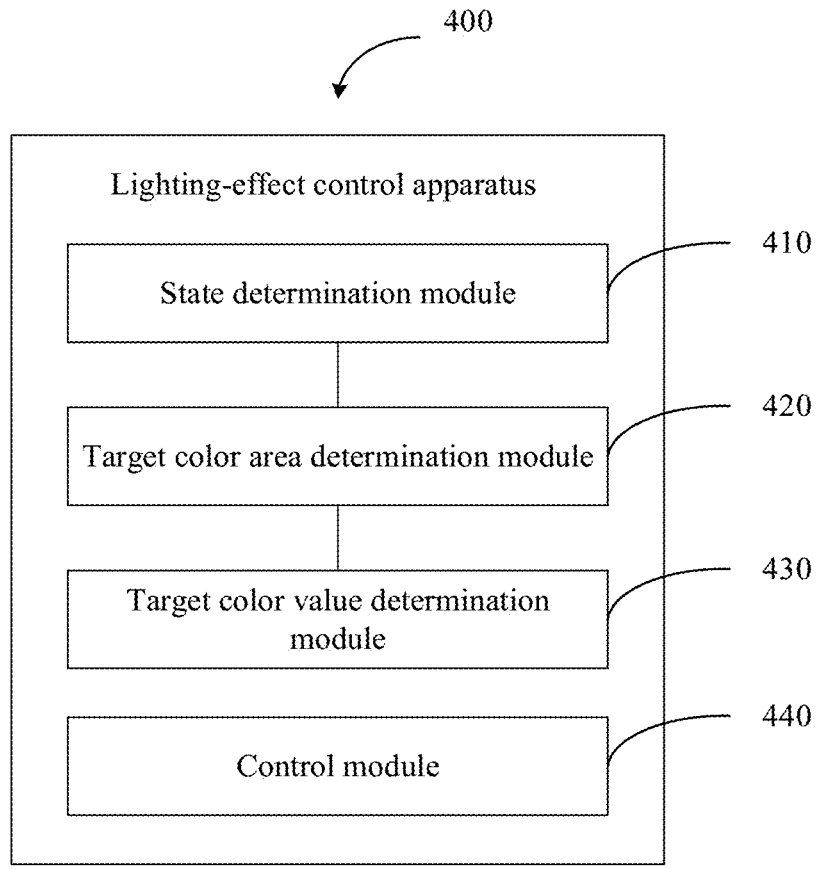
FIG. 9 shows a structural block diagram of a lighting-effect control apparatus proposed in an embodiment of the present disclosure.

Referring to FIG. 9, embodiments of the present disclosure provide a lighting-effect control apparatus 400. The apparatus is applied to the controller. The controller is connected to the plurality of lighting units and the detection sensor respectively. The lighting-effect control apparatus 400 includes: a state determination module 410, a target color area determination module 420, a target color value determination module 430, and a control module 440.

Specifically, the state determination module 410 is used to determine the state of the lighting device.

The target color area determination module 420 is used to determine the target color area according to the detection data of the detection sensor if the state of the lighting device is a motion state.

The target color value determination module 430 is used to determine the target color value corresponding to each lighting unit according to the target color area.

The control module 440 is used to control the target lighting unit to display the corresponding target color value.

In some implementations, the target color area determination module 410 includes: a color pointing vector unit and a target color area determination unit.

Among them, the color pointing vector unit is used to determine the color pointing vector according to the detection data of the detection sensor if the state of the lighting device is in the motion state.

The target color area determination unit is used to determine the target color area according to the color pointing vector and the initial color area.

In some embodiments, the target color area determination unit includes: a color component sub-unit and a color pointing vector sub-unit.

Among them, the color component sub-unit is used to determine the color components according to the detection data of the detection sensor.

The color pointing vector sub-unit is used to determine the color pointing vector based on the color components.

In some embodiments, the detection data includes first detection data in the first direction, second detection data in the second direction, and third detection data in the third direction, etc.

In some implementations, the color component sub-unit includes: a first color component sub-unit, a second color component sub-unit, and a third color component sub-unit.

The first color component sub-unit is used to determine the first color component according to the first detection data; and the first color component is the color component of the first dimension of the preset color space.

The second color component sub-unit is used to determine the second color component according to the second detection data; and the second color component is the color component of the second dimension of the preset color space.

The third color component sub-unit is used to determine the third color component according to the third detection data; and the third color component is the color component of the third dimension of the preset color space.

In some embodiments, the state determination module 410 includes a detection data acquisition unit, a motion state determination unit, and a stationary state determination unit.

Among them, the detection data acquisition unit is used to obtain detection data from the detection sensor.

The motion state determination unit is used to determine the state of the lighting device to be a motion state if the detection data is greater than the preset detection threshold.

The stationary state determination unit is used to determine the state of the lighting device to be a stationary state if the detection data is not greater than the preset detection threshold.

It should be noted that each embodiment in this specification is described in a progressive manner. Each embodiment may focus on its differences from other embodiments. The same and similar parts between the various embodiments may be referred to each other. For the apparatus type embodiments, since they may be similar to the method embodiments, the description is relatively simple. For relevant details, please refer to the partial description of the method embodiments. Any processes described in the method embodiments can be implemented by corresponding processing modules in the apparatus embodiments, and will not be described one by one in the apparatus embodiments.

Figure 10:
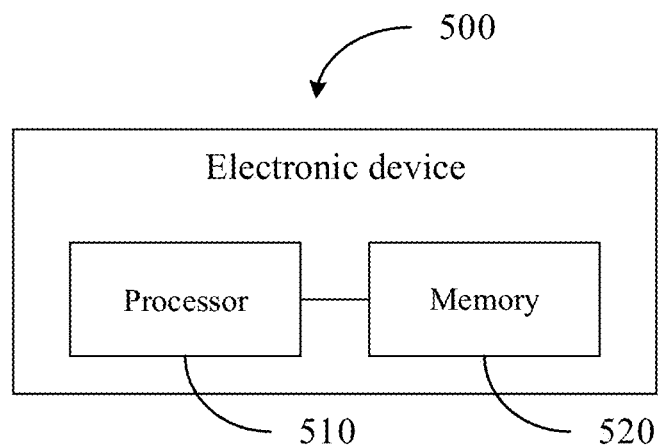
FIG. 10 shows a structural block diagram of an electronic device proposed by an embodiment of the present disclosure.

Referring to FIG. 10, an embodiment of the present disclosure provides an electronic device 500. The electronic device 500 may be a smartphone, a tablet, an e-book, a touch screen, or other electronic device capable of running applications. The electronic device in this disclosure may include one or more of the following components: at least one processor 510, a memory 520, and an application program, where one or more application programs may be stored in the memory 520 and configured to be executed by the one or more processor 510, and one or more application programs are configured to execute the lighting-effect control methods as described in the foregoing method embodiments.

The processor 510 may include one or more processing cores. The processor 510 uses various interfaces and wirings to connect various parts of the entire electronic device and, by running or executing instructions, programs, code sets or instruction sets stored in the memory 520, and calling data stored in the memory 520, performs various functions of the electronic device and processes data. Optionally, the processor 510 may adopt at least one of digital signal processing (DSP), field-programmable gate array (FPGA), and programmable logic array (PLA) to be implemented in hardware form. The processor 510 may integrate one or a combination of a central processing unit (CPU), a graphics processor (Graphics Processing Unit, GPU), a modem, etc. Among them, the CPU mainly handles the operating system, user interface, and applications; the GPU is responsible for rendering and drawing the display content; and the modem is used to handle wireless communications. It can be understood that the above-mentioned modem may not be integrated into the processor and may be implemented solely through a communication chip.

The memory 520 may include random access memory (RAM) or read-only memory (ROM). Memory 520 may be used to store instructions, programs, codes, sets of codes, or sets of instructions. The memory 520 may include a storage program area and a storage data area, wherein the storage program area may store instructions for implementing the operating system, instructions for implementing at least one function (such as the lighting-device state determination function, the lighting-effect control function, etc.), and instructions to implement each method embodiment described above. The storage data area can also store data created by the electronic device during use (such as state of the lighting device, target color value, lighting unit pointing information, etc.).

Figure 11:
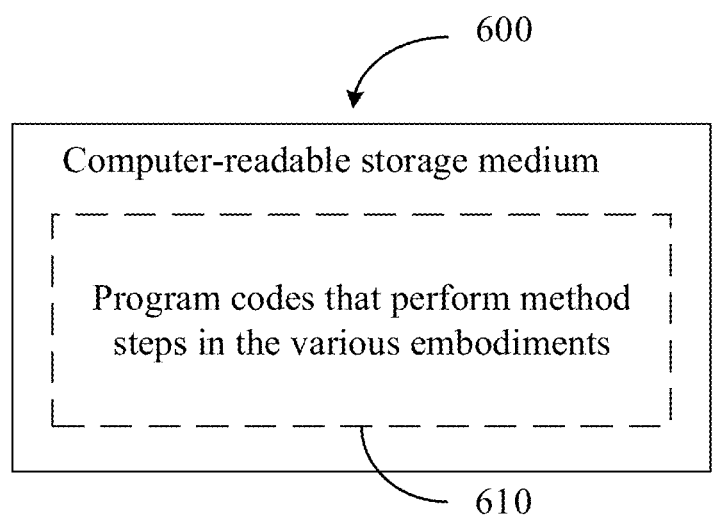
FIG. 11 shows a structural block diagram of a computer-readable storage medium proposed by an embodiment of the present disclosure.

Referring to FIG. 11, FIG. 11 shows a structural block diagram of a computer-readable storage medium provided by an embodiment of the present disclosure. Program codes 610 are stored in the computer-readable medium 600, and the program codes 610 can be called by the processor to execute the lighting-effect control method described in the above method embodiments.

Computer readable storage medium 600 may be electronic memory such as flash memory, EEPROM (Electrically Erasable Programmable Read Only Memory), EPROM, hard disk, or ROM. Optionally, the computer-readable storage medium 610 includes a non-transitory computer-readable storage medium. The computer-readable storage medium 610 has storage space for program codes that perform any method steps in the above-mentioned methods. The program codes 610 may be read from or written into one or more computer program products. The program codes may, for example, be compressed in a suitable form.

Embodiments of the present disclosure also provide a computer program product or computer program. The computer program product or computer program includes computer instructions, and the computer instructions are stored in a computer-readable storage medium. The processor of the electronic device reads the computer instructions from the computer-readable storage medium, and the processor executes the computer instructions, so that the computer device performs the lighting-effect control method described in the above various implementations.

Accordingly, embodiments of the present disclosure provide a lighting-effect control method, apparatus, lighting device, electronic device, and storage medium. The lighting-effect control method is applied to a controller, and the controller is connected to a plurality of lighting units and a detection sensor respectively. The control method includes: determining the state of the lighting device; if the state of the lighting device is in motion, determining the target color area according to the detection data of the detection sensor, determining the target color value corresponding to each lighting unit according to the target color area, and controlling each lighting unit to display the corresponding target color value, thereby dynamically adjusting the target color value displayed by each lighting unit according to changes in state of the lighting device and detection data, enriching the lighting-effect control methods.

Finally, it should be noted that the above embodiments are only used to illustrate the technical solutions of the present disclosure, but not to limit it. Although the present disclosure has been described in detail with reference to the foregoing embodiments, those of ordinary skill in the art will understand that: modifications can be made to the technical solutions described in the foregoing embodiments, or equivalent substitutions can be made to some of the technical features. However, these modifications or substitutions do not cause the essence of the corresponding technical solutions to deviate from the spirit and scope of the technical solutions in the embodiments of the present disclosure.

What is claimed is:

1. A lighting-effect control method applicable to a controller of a lighting device, wherein the controller is connected to a plurality of lighting units and a detection sensor respectively, the control method comprising:
   determining a state of the lighting device;
   when the state of the lighting device is a motion state, determining a target color area according to detection data of the detection sensor;
   determining a target color value corresponding to each lighting unit according to the target color area; and
   controlling each lighting unit to display a corresponding target color value,
   wherein the target color area includes a plurality of color sub-areas, and each lighting unit corresponds to one of the color sub-areas; and the determining a target color value corresponding to each lighting unit according to the target color area further includes:
   determining the target color value corresponding to each lighting unit according to the color sub-area corresponding to each lighting unit, and
   wherein the determining the target color value corresponding to each lighting unit according to the color sub-area corresponding to each lighting unit further includes:
   using an average value of all color values in the color sub-area corresponding to each lighting unit as the target color value corresponding to each lighting unit.

2. The method according to claim 1, wherein the when the state of the lighting device is a motion state, determining a target color area according to detection data of the detection sensor further includes:

when the state of the lighting device is the motion state, determining a color pointing vector according to the detection data of the detection sensor; and
determining the target color area according to the color pointing vector and an initial color area.

3. The method according to claim 2, wherein the determining a color pointing vector according to the detection data of the detection sensor further includes:
determining color components based on the detection data of the detection sensor; and
determining the color pointing vector based on the color components.

4. The method according to claim 3, wherein:
the detection data includes first detection data in a first direction, second detection data in a second direction, and third detection data in a third direction; and
the determining color components based on the detection data of the detection sensor further includes:
determining a first color component according to the first detection data, the first color component being a color component in a first dimension of a preset color space;
determining a second color component according to the second detection data, the second color component being a color component in a second dimension of the preset color space; and
determining a third color component according to the third detection data, the third color component being a color component in a third dimension of the preset color space.

5. The method according to claim 4, wherein the determining the color pointing vector according to the color components further includes:
synthesizing the first color component, the second color component, and the third color component to obtain the color pointing vector.

6. The method of claim 1, wherein a total number of color sub-areas is not less than a total number of lighting units.

7. The method according to claim 1, the method further comprising:
when the state of the lighting device is a stationary state, controlling the plurality of lighting units to display a stationary lighting effect.

8. The method according to claim 7, wherein the when the state of the lighting device is a stationary state, controlling the plurality of lighting units to display a stationary lighting effect further includes:
when the state of the lighting device is in the stationary state, controlling the plurality of lighting units to display a color value corresponding to an initial color area.

9. The method according to claim 1, wherein, before determining the state of the lighting device, the method further includes:
in response to a lighting-effect control mode selection operation, enter a lighting-effect control mode, and
wherein the determining the state of the lighting device further includes:
under the lighting-effect control mode, determining the state of the lighting device.

10. The method according to claim 1, wherein the determining the state of the lighting device further includes:
obtaining the detection data from the detection sensor;
when the detection data is greater than a preset detection threshold, determining the state of the lighting device as the motion state; and
otherwise, determining the state of the lighting device as a stationary state.

11. An electronic device, comprising:
a memory for storing computer-readable instructions; and
at least one processor coupled to the memory and, when executing the computer-readable instructions, configured to perform:
determining a state of a lighting device having a plurality of lighting units and a detection sensor;
when the state of the lighting device is a motion state, determining a target color area according to detection data of the detection sensor;
determining a target color value corresponding to each lighting unit according to the target color area; and
controlling each lighting unit to display a corresponding target color value,
wherein the when the state of the lighting device is a motion state, determining a target color area according to detection data of the detection sensor further includes:
when the state of the lighting device is the motion state, determining a color pointing vector according to the detection data of the detection sensor; and
determining the target color area according to the color pointing vector and an initial color area,
wherein the determining a color pointing vector according to the detection data of the detection sensor further includes:
determining color components based on the detection data of the detection sensor; and
determining the color pointing vector based on the color components,
wherein the detection data includes first detection data in a first direction, second detection data in a second direction, and third detection data in a third direction; and the determining color components based on the detection data of the detection sensor further includes:
determining a first color component according to the first detection data, the first color component being a color component in a first dimension of a preset color space;
determining a second color component according to the second detection data, the second color component being a color component in a second dimension of the preset color space; and
determining a third color component according to the third detection data, the third color component being a color component in a third dimension of the preset color space; and
wherein the first color component, the second color component, and the third color component are synthesized together to obtain the color pointing vector.

12. A non-transitory computer-readable storage medium containing computer-executable instructions for, when executed by one or more processors, performing a light-emitting device control method, the method comprising:
determining a state of a lighting device having a plurality of lighting units and a detection sensor;
when the state of the lighting device is a motion state, determining a target color area according to detection data of the detection sensor;
determining a target color value corresponding to each lighting unit according to the target color area; and
controlling each lighting unit to display a corresponding target color value,
wherein the when the state of the lighting device is a motion state, determining a target color area according to detection data of the detection sensor further includes:

when the state of the lighting device is the motion state, determining a color pointing vector according to the detection data of the detection sensor; and
determining the target color area according to the color pointing vector and an initial color area,
wherein the determining a color pointing vector according to the detection data of the detection sensor further includes:
determining color components based on the detection data of the detection sensor; and
determining the color pointing vector based on the color components,
wherein the detection data includes first detection data in a first direction, second detection data in a second direction, and third detection data in a third direction; and the determining color components based on the detection data of the detection sensor further includes:
determining a first color component according to the first detection data, the first color component being a color component in a first dimension of a preset color space;
determining a second color component according to the second detection data, the second color component being a color component in a second dimension of the preset color space; and
determining a third color component according to the third detection data, the third color component being a color component in a third dimension of the preset color space; and
wherein the first color component, the second color component, and the third color component are synthesized together to obtain the color pointing vector.

* * * * *